Jan. 9, 1951 R. R. ALLEN 2,537,613
FISHING REEL
Filed Aug. 22, 1944

INVENTOR
RANEY R. ALLEN,
By Dybvig & Dybvig
HIS ATTORNEYS.

Patented Jan. 9, 1951

2,537,613

UNITED STATES PATENT OFFICE 2,537,613

FISHING REEL

Raney R. Allen, Dayton, Ohio

Application August 22, 1944, Serial No. 550,617

2 Claims. (Cl. 242—96)

This invention relates to a fishing reel and more particularly to a fishing reel adapted for casting a fish line.

In the past, line casting and much of still fishing has been thought of in terms of a rod and reel. Sportsmen have played up the art of casting with the use of a reel and rod.

An object of this invention is to provide a reel adapted for use in fishing without the use of a rod, which reel is used in reeling the line and adapted to permit the line to be withdrawn from the spool thereof in a direction parallel to its axis of rotation. The line is withdrawn without rotation of the spool, thereby eliminating the complications associated with a rod and reel such as the snarling of the line caused by the reel spinning, the packing of the rod in transit, the mounting of the reel upon the rod, et cetera.

Other objects and advantages reside in the construction of parts, the combination thereof and the mode of operation, as will become more apparent from the following description.

Referring to the drawings, Figure 1 discloses a perspective view of a fishing reel held in the hand of a fisherman.

Figure 4:
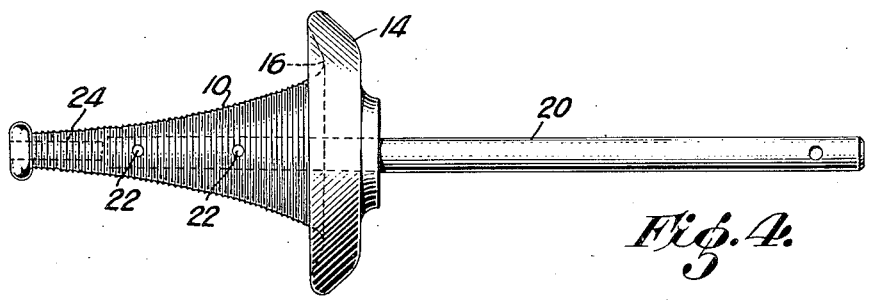
Figure 3:
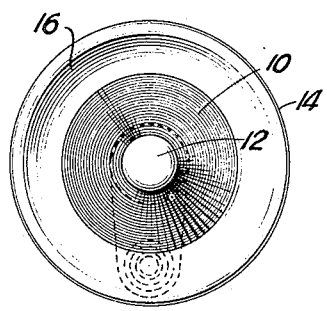
Figure 3 is an end elevational view as seen from the left of Figure 2.

Figure 4 discloses a spool together with the spool shaft before assembling the handle and the crank.

Figure 2:
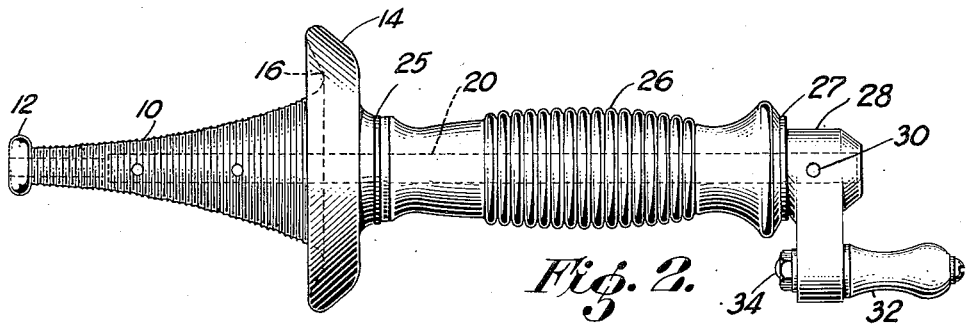
Figure 2 is a side elevational view of the reel.

In the drawings, the reference character 10 indicates a frustro-conical portion of the spool that may be provided with annular grooves and ribs, as clearly shown in Figures 2 and 4. An annular collar 12 is mounted at the apex of the frustro-conical spool portion 10. An annular flange portion 14 is located at the large end of the spool. This flange portion 14 is provided with an undercut groove 16. A shaft or shank 20 has one end fixedly mounted in an aperture extending into the spool 10. It may be held in position by a pair of pegs or pins 22. A smaller hole 24 may be located in the end of the spool 10, so as to provide an air escape passage when the shaft 20 is inserted into the reel.

A handle 26 is rotatably mounted on the shaft 20. This handle has one end abutting a washer 25 contacting the end of the spool 10 and the other end abutting a washer 27 engaging a crank arm 28 keyed to the end of the shaft 20 by a suitable key 30 and supporting a handle 32 mounted upon a suitable screw or bolt 34 passing through a suitable aperture in the end of the crank arm 28. The spool is so mounted with respect to the handle and the shaft that the spool tapers from the handle towards the end of the reel assembly.

Figure 1:
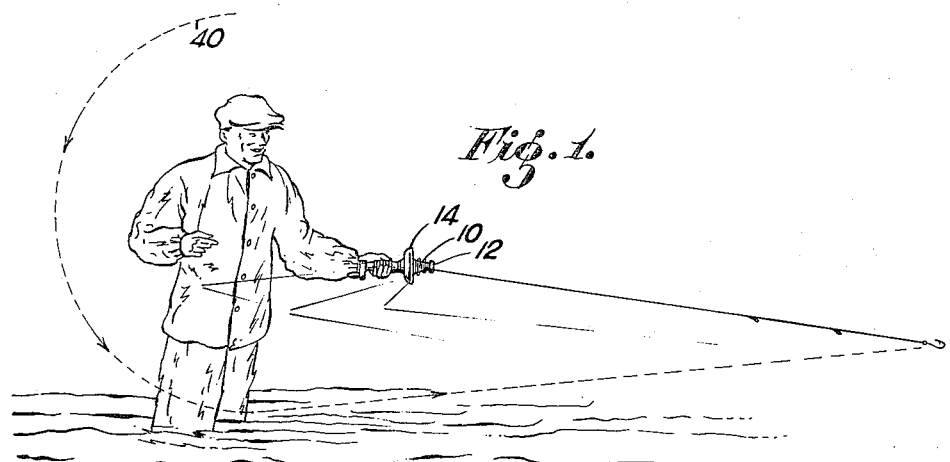

As may best be seen by referring to Figure 1, the fisherman holds the handle 26 preferably with his left hand. With his right hand he grabs the hook or the bait or the line near the end, swinging it through the arc 40, so as to throw it outwardly in the direction shown by the full line position of the line in Figure 1, permitting the line to be withdrawn from the narrow end of the reel without rotating the spool. When the hook is over the target, it is merely necessary to give the reel assembly a jerk, interrupting the withdrawal of the line, arresting the movement of the hook, so as to cause the bait, the hook, et cetera, to drop in the desired location.

After the hook drops into the water it may be towed by orienting the spool through 90°, then rotating the spool by the crank, thereby slowly pulling the hook and bait through the water towards the fisherman. When it has been reeled, the operation may be repeated.

For still fishing, the fisherman may throw the hook and bait into the water as described above, place the reel in the crotch of a tree, in a bush, in a crevice or between rocks and leave the line for the time being.

The parts used in the manufacture of the reel, with the exception of the screw and the pegs, may be turned out of wood, molded from plastic or made from metal, or a combination of materials, depending upon the avialable materials, the price range and the use to which the reel is to be put. Likewise, it may be made in various sizes, depending upon the type of fishing. For lake and stream fishing, the spool may be made small, compatible with the size and type of fish. For sea fishing, especially fishing for large game fish, the spool may be made much larger and from heavier and stronger material. The finished reel may have a natural finish, resulting from the materials used in its manufacture, or it may be coated with a suitable coating material, so as to provide the desired color, luster and sheen.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fishing reel assembly used in casting without a rod, said assembly including a hand grip handle having an aperture forming a bearing, a frustro-conical spool adapted to have the line withdrawn in a direction parallel to the axis of rotation of the spool, a shaft extending through the handle and journalled in the bearing for supporting the spool, said spool including a flange-like portion adjacent the handle adapted to be engaged by the thumb of the hand so as to arrest the movement of the spool, and a crank on the shaft adjacent the end of the handle opposite the spool for winding the same.

2. A fishing reel assembly used in casting without a rod, said assembly including a frustro-conical spool having an annular flange-like portion adjacent one end thereof, said spool being adapted to have the line withdrawn in a direction parallel to the axis of rotation of the spool, said annular flange-like portion being provided with an undercut groove adjacent the spool, a shaft projecting from the flanged end of the spool, the longitudinal axis of the shaft and the spool being concentrically disposed, a hand grip handle mounted on the shaft adjacent the flange-like portion so that the flange-like portion may be engaged by the thumb of the hand so as to arrest the movement of the spool, and a crank mounted on the shaft adjacent the end of the handle opposite the spool, said handle functioning as a bearing for the reel assembly.

RANEY R. ALLEN.

REFERENCES CITED

The following references are of record in the file of this patent:

UNITED STATES PATENTS

| Number | Name | Date |
|---|---|---|
| 1,150,575 | Blodgett | Aug. 17, 1915 |
| 1,625,988 | Dice | Apr. 26, 1927 |
| 1,862,611 | Swearingen | June 14, 1932 |
| 2,083,689 | Clifford | June 15, 1937 |

FOREIGN PATENTS

| Number | Country | Date |
|---|---|---|
| 115,445 | Australia | July 16, 1942 |
| 840,575 | France | Apr. 27, 1939 |